(12) United States Patent
Schroeter

(10) Patent No.: US 9,525,767 B2
(45) Date of Patent: *Dec. 20, 2016

(54) SYSTEM AND METHOD FOR ANSWERING A COMMUNICATION NOTIFICATION

(71) Applicant: AT&T INTELLECTUAL PROPERTY I, LP, Atlanta, GA (US)

(72) Inventor: Horst J. Schroeter, New Providence, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/058,355

(22) Filed: Mar. 2, 2016

(65) Prior Publication Data

US 2016/0182700 A1   Jun. 23, 2016

Related U.S. Application Data

(63) Continuation of application No. 14/539,179, filed on Nov. 12, 2014, now Pat. No. 9,319,504, which is a
(Continued)

(51) Int. Cl.
*G10L 13/08* (2013.01)
*G10L 13/00* (2006.01)
(Continued)

(52) U.S. Cl.
CPC .............. *H04M 1/578* (2013.01); *G10L 13/00* (2013.01); *G10L 13/043* (2013.01); *G10L 15/26* (2013.01);
(Continued)

(58) Field of Classification Search
CPC ........ G10L 17/22; G10L 17/26; G10L 13/027; G10L 15/08; G10L 21/0272; H04N 21/482; H04N 21/472; H04M 3/42221; H04M 3/568; G06F 3/16; G06F 17/2765; G06F 17/30654
(Continued)

(56) References Cited

U.S. PATENT DOCUMENTS 4,922,490 A * 5/1990 Blakley ................. H04M 1/253
370/271
5,490,205 A * 2/1996 Kondo .................. H04M 1/725
379/196
(Continued)

*Primary Examiner* — Edgar Guerra-Erazo

(57) ABSTRACT

Disclosed herein are systems, methods, and computer readable-media for answering a communication notification. The method for answering a communication notification comprises receiving a notification of communication from a user, converting information related to the notification to speech, outputting the information as speech to the user, and receiving from the user an instruction to accept or ignore the incoming communication associated with the notification. In one embodiment, information related to the notification comprises one or more of a telephone number, an area code, a geographic origin of the request, caller id, a voice message, address book information, a text message, an email, a subject line, an importance level, a photograph, a video clip, metadata, an IP address, or a domain name. Another embodiment involves notification assigned an importance level and repeat attempts at notification if it is of high importance.

20 Claims, 4 Drawing Sheets

Related U.S. Application Data continuation of application No. 14/181,997, filed on Feb. 17, 2014, now Pat. No. 8,892,442, which is a continuation of application No. 13/688,611, filed on Nov. 29, 2012, now Pat. No. 8,655,662, which is a continuation of application No. 12/102,197, filed on Apr. 14, 2008, now Pat. No. 8,370,148.

(51) Int. Cl.
| | |
|---|---|
| *G10L 17/00* | (2013.01) |
| *G10L 21/00* | (2013.01) |
| *G10L 15/26* | (2006.01) |
| *G10L 15/06* | (2013.01) |
| *H04M 1/57* | (2006.01) |
| *G10L 13/04* | (2013.01) |
| *H04W 4/12* | (2009.01) |
| *H04M 1/725* | (2006.01) |
| *H04M 3/436* | (2006.01) |
| *H04W 4/16* | (2009.01) |
| *H04M 1/60* | (2006.01) |

(52) U.S. Cl.
CPC .......... *G10L 15/265* (2013.01); *H04M 1/6033* (2013.01); *H04M 1/72527* (2013.01); *H04M 3/436* (2013.01); *H04W 4/12* (2013.01); *H04W 4/16* (2013.01)

(58) Field of Classification Search
USPC .............. 704/260, 261, 246, 258, 276, 270, 270.1, 704/275, 235
See application file for complete search history.

(56) References Cited

U.S. PATENT DOCUMENTS

| | | | | |
|---|---|---|---|---|
| 6,085,080 A * | 7/2000 | Rahikainen | ........... | H04M 1/663 455/403 |
| 6,246,889 B1 * | 6/2001 | Boltz | ................. | H04M 3/4283 379/245 |
| 6,459,780 B1 * | 10/2002 | Wurster | ................ | H04M 1/663 379/142.02 |
| 6,496,569 B2 * | 12/2002 | Pelletier | ............... | H04M 15/06 379/142.01 |
| RE38,101 E * | 4/2003 | Vysotsky | ............. | G10L 15/065 379/189 |
| 6,600,975 B2 * | 7/2003 | Moriguchi | .......... | H04M 1/6091 342/357.57 |
| 6,724,866 B2 * | 4/2004 | Kuhn | .................... | H04M 3/436 379/142.01 |
| 6,760,581 B2 * | 7/2004 | Dutta | .................... | H04M 1/663 379/201.01 |
| 6,826,529 B1 * | 11/2004 | Zhang | .................. | H04M 3/436 379/15.02 |
| 6,975,709 B2 | 12/2005 | Wullert et al. | | |
| 7,043,436 B1 * | 5/2006 | Ryu | ........................ | G10L 13/00 704/258 |
| 7,162,421 B1 * | 1/2007 | Zeppenfeld | ............ | G10L 15/22 704/233 |
| 7,231,232 B2 * | 6/2007 | Osann, Jr. | .......... | H04M 1/6505 455/415 |
| 7,292,152 B2 * | 11/2007 | Torkkola | ................ | G08B 21/06 340/426.2 |
| 7,349,782 B2 * | 3/2008 | Churchill | ............... | G08G 1/164 340/438 |
| 7,392,188 B2 * | 6/2008 | Junkawitsch | .......... | G10L 15/20 704/251 |
| 7,480,620 B2 * | 1/2009 | Bennett | ........................ | 704/246 |
| 7,482,620 B2 | 1/2009 | Kugler et al. | | |
| 7,609,150 B2 * | 10/2009 | Wheatley | ............... | B60Q 9/008 340/436 |
| 7,650,170 B2 | 1/2010 | May et al. | | |
| 7,801,284 B1 * | 9/2010 | Chakra | ........... | H04M 1/274525 379/88.03 |
| 8,270,588 B2 * | 9/2012 | Schwartz | ............... | H04M 3/436 379/201.02 |
| 8,275,348 B2 * | 9/2012 | Yen | ..................... | H04M 1/6075 340/576 |
| 8,433,041 B2 * | 4/2013 | Clark | ................ | H04M 3/42204 340/5.52 |
| 2002/0078148 A1 * | 6/2002 | Hinde | ..................... | G10L 15/30 709/203 |
| 2002/0116461 A1 * | 8/2002 | Diacakis | .............. | G06Q 10/087 709/204 |
| 2003/0054865 A1 * | 3/2003 | Byers | .................... | H04M 1/642 455/567 |
| 2003/0086541 A1 * | 5/2003 | Brown | ................ | H04M 3/4228 379/88.01 |
| 2003/0216988 A1 * | 11/2003 | Mollett | .................. | G06Q 20/00 705/35 |
| 2004/0067751 A1 * | 4/2004 | Vandermeijden | ....... | H04M 1/57 455/414.1 |
| 2004/0186720 A1 | 9/2004 | Kemmochi et al. | | |
| 2004/0186728 A1 * | 9/2004 | Kuboyama | ......... | H04M 1/7253 704/276 |
| 2005/0008129 A1 * | 1/2005 | Wullert | ................ | H04M 1/642 379/88.22 |
| 2005/0056600 A1 * | 3/2005 | Ranney | ................ | B01D 61/022 210/806 |
| 2005/0130643 A1 * | 6/2005 | Pappalardo | ....... | H04M 1/72522 455/418 |
| 2005/0136907 A1 | 6/2005 | Pappalardo et al. | | |
| 2005/0183143 A1 * | 8/2005 | Anderholm | ............ | G06F 11/32 726/22 |
| 2005/0192061 A1 * | 9/2005 | May | .................... | H04M 1/6066 455/563 |
| 2005/0227740 A1 * | 10/2005 | Orbach | ................ | H04M 1/642 455/567 |
| 2005/0276390 A1 | 12/2005 | Sikora et al. | | |
| 2006/0034441 A1 * | 2/2006 | Kraft | ..................... | H04M 1/575 379/142.01 |
| 2006/0056600 A1 | 3/2006 | Merrow et al. | | |
| 2006/0168037 A1 * | 7/2006 | Audu | ...................... | H04L 51/04 709/206 |
| 2006/0182242 A1 * | 8/2006 | Henry | ..................... | H04L 67/24 379/114.01 |
| 2006/0217159 A1 * | 9/2006 | Watson | ............. | H04M 1/72522 455/563 |
| 2006/0245391 A1 * | 11/2006 | Vaidya | ............. | H04M 3/42153 370/329 |
| 2007/0008239 A1 * | 1/2007 | Stroupe | ................. | G06F 3/1454 345/1.1 |
| 2008/0015846 A1 * | 1/2008 | Acero | .................... | G10L 15/22 704/201 |
| 2008/0045184 A1 * | 2/2008 | Randall | ................. | H04M 1/576 455/412.2 |
| 2009/0086953 A1 * | 4/2009 | Vendrow | ............... | H04M 3/436 379/207.02 |

\* cited by examiner

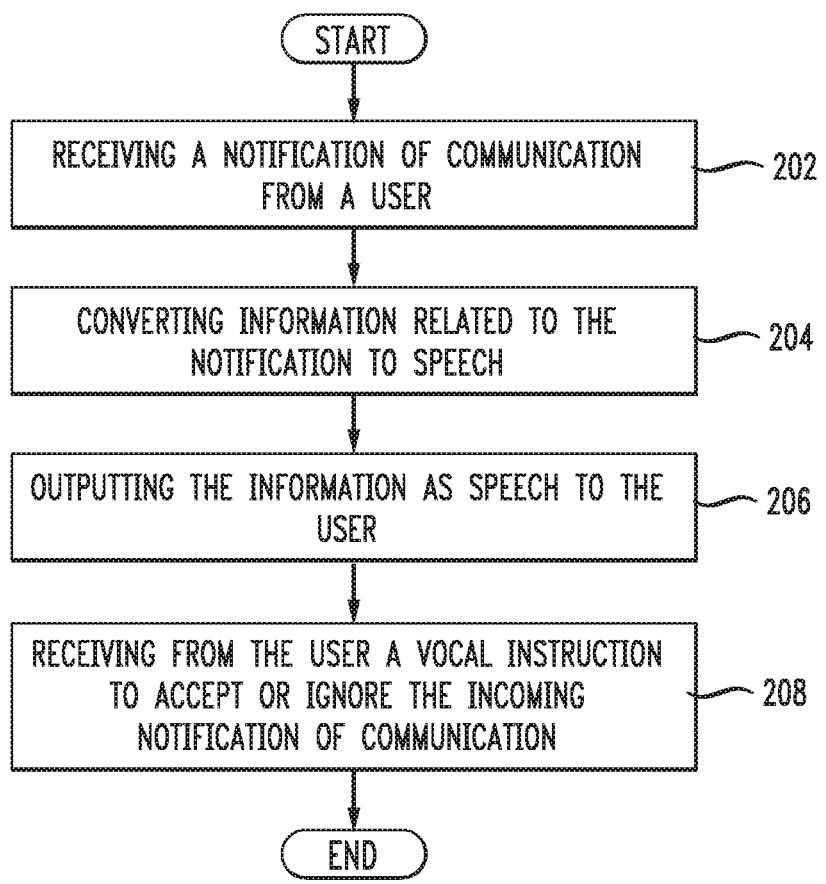

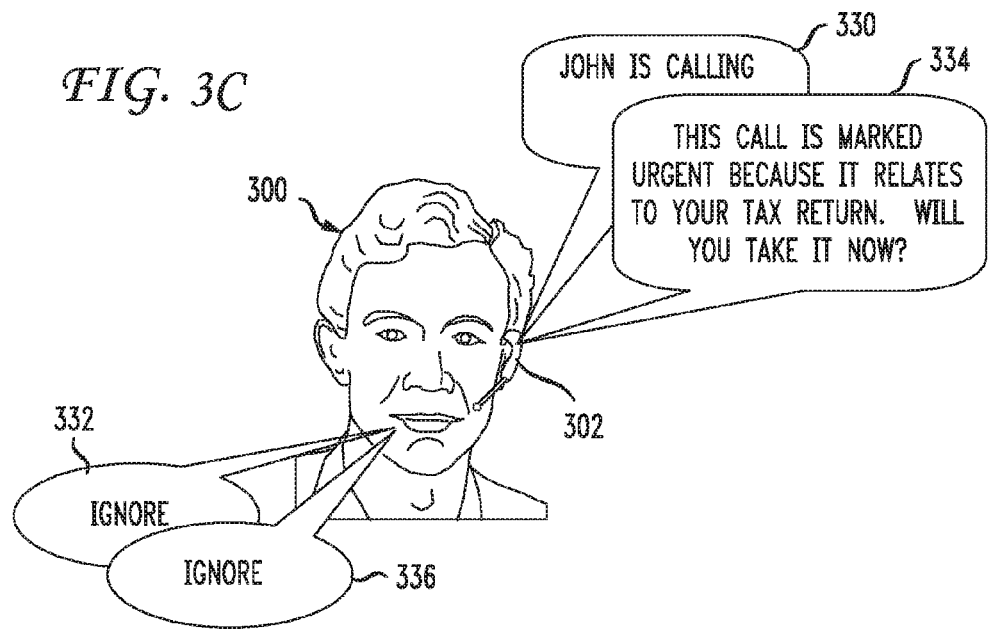
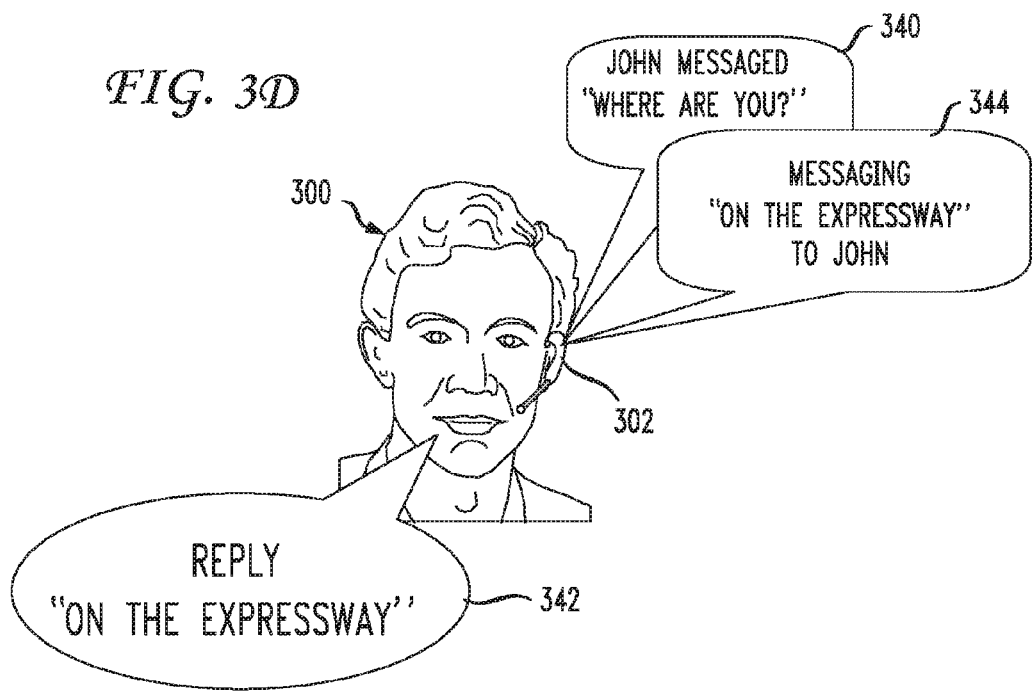

SYSTEM AND METHOD FOR ANSWERING A COMMUNICATION NOTIFICATION

CROSS-REFERENCE TO RELATED APPLICATIONS

This application is a Continuation of and claims priority to U.S. patent application Ser. No. 14/539,179 filed Nov. 12, 2014, which is a continuation of U.S. patent application Ser. No. 14/181,997, filed Feb. 17, 2014, now U.S. Pat. No. 8,892,442, which is a continuation of U.S. patent application Ser. No. 13/688,611, filed Nov. 29, 2012, now U.S. Pat. No. 8,655,662, which is a continuation of U.S. patent application Ser. No. 12/102,197, filed Apr. 14, 2008, now U.S. Pat. No. 8,370,148. The contents of each of the foregoing are hereby incorporated by reference into this application as if set forth herein in full.

BACKGROUND OF THE INVENTION

1. Field of the Invention

The present invention relates to communication and more specifically to vocal notification and acceptance of communication notifications.

2. Introduction

The advent and subsequent mass popularity of the cellular phone has spawned a whole host of issues. As the general public started to use cell phones, many people wanted to take or make phone calls while driving. In fact, many people operate their cell phone while driving, which distracts them and occupies their hands, posing a serious safety risk to the driver as well as to pedestrians and drivers in surrounding vehicles. The problem of distracted drivers caused some jurisdictions to outlaw manually operating cellular phones or other electronic gadgets while driving.

One approach in the art is to use a Bluetooth headset to speak, freeing up the hands from holding a cell phone to the ear, but this approach still requires the user to touch a button somewhere to receive the phone call. Another approach in the art is to turn on speaker phone in the car. This approach still forces the user to touch the cellular phone when a call is being received and there are obvious drawbacks to having a call on speaker phone. For example, if the call is confidential or embarrassing and passengers are present who the user would rather not hear the conversation, or if passengers are children who are loud, the other party could hear the loud children through the speaker phone.

Other scenarios exist where a person may want to answer a phone call but is unable to use their hands or it would be unsafe to take their hands away from the task at hand.

Accordingly, what is needed in the art is an improved way to answer a phone call privately without occupying a user's hands.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, methods and computer-readable media for answering a communication by receiving a notification of communication to a user, converting information related to the notification to speech, outputting the information as speech to the user, and receiving from the user a vocal instruction to accept or ignore the incoming of communication associated with the notification.

The systems, methods, and computer-readable media provide that the information related to the notification may comprise one or more of a telephone number, an area code, a geographic origin of the request, caller id, a voice message, address book information, a text message, an email, a subject line, an importance level, a photograph, a video clip, metadata, an IP address, or a domain name.

One embodiment indicates that the information is only outputted to the user if the notification is assigned an importance level of the notification is above a dynamic or static threshold. A related embodiment outputs the information to the user again if the user ignores a high importance notification and can include an indication of the importance level or an explanation of why the importance level is high. In a practical aspect of the embodiments, the information is outputted to the user via a hands-free device, such as a Bluetooth headset. In another embodiment, a user profile or multiple user profiles for multiple scenarios or environments is used to determine which information to output to the user.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 2 illustrates a method embodiment for answering a communication notification;

FIG. 3C illustrates a dialog between an exemplary system and a user; and

FIG. 3D illustrates a dialog between an exemplary system and a user.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1A:
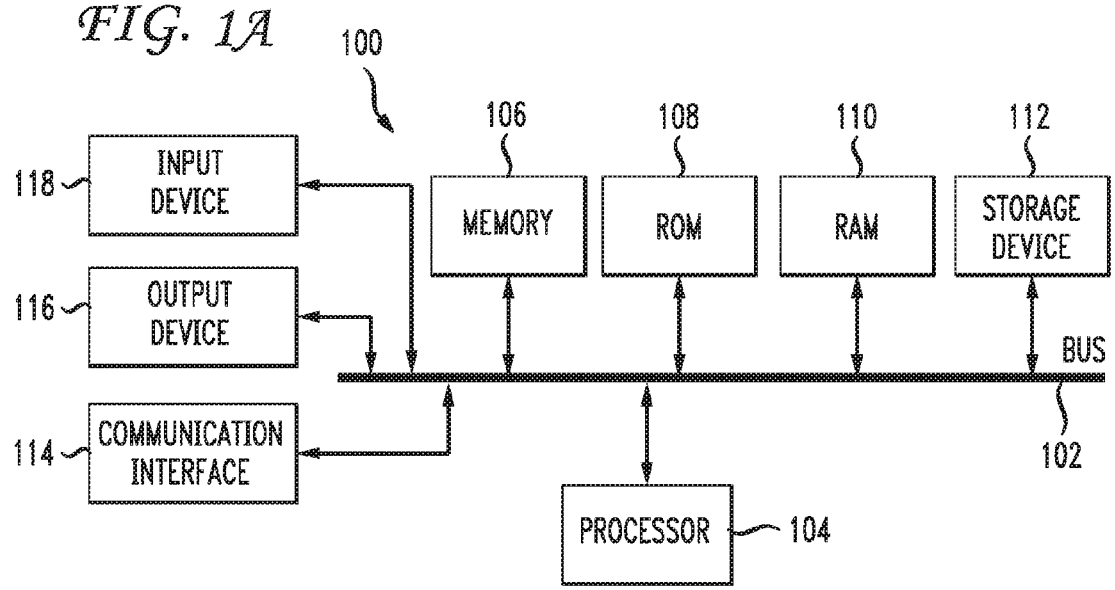
FIG. 1A illustrates an example system embodiment.

With reference to FIG. 1A, an exemplary system includes a general-purpose computing device 100, including a processing unit (CPU) 104 and a system bus 102 that couples various system components including the system memory such as read only memory (ROM) 108 and random access memory (RAM) 110 to the processing unit 104. Other system memory 106 may be available for use as well. It can be appreciated that the invention may operate on a computing device with more than one CPU 104 or on a group or cluster of computing devices networked together to provide greater processing capability. The system bus 102 may be any of several types of bus structures including a memory bus or memory controller, a peripheral bus, and a local bus using any of a variety of bus architectures. A basic input/output (BIOS) stored in ROM 108 or the like, may provide the basic routine that helps to transfer information between elements within the computing device 100, such as during start-up. The computing device 100 further includes storage devices such as a hard disk drive 112, a magnetic disk drive, an optical disk drive, tape drive or the like. The storage device 112 is connected to the system bus 102 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 118 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 110 can also be one or more of a number of output mechanisms known to those of skill in the art. In some instances, multimodal systems enable a user to provide multiple types of input to communicate with the computing device 100. The communications interface 114 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1A may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

Figure 1B:
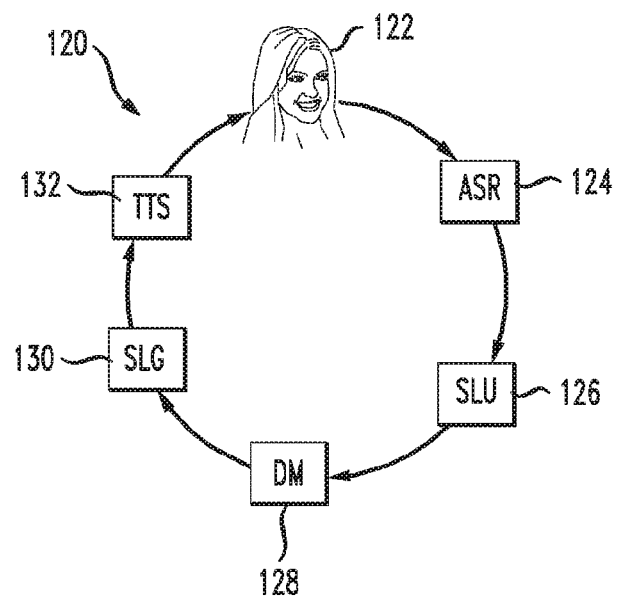
FIG. 1B illustrates an example spoken dialog system.

Spoken dialog systems aim to identify intents of humans, expressed in natural language, and take actions accordingly, to satisfy their requests. FIG. 1B is a functional block diagram of an exemplary natural language spoken dialog system 120. Natural language spoken dialog system 120 may include an automatic speech recognition (ASR) module 124, a spoken language understanding (SLU) module 126, a dialog management (DM) module 128, a spoken language generation (SLG) module 130, and a text-to-speech (TTS) module 132. The TTS module may be any type of speech output module. For example, it may be a module wherein one of a plurality of prerecorded speech segments is selected and played to a user. Thus, the TTS module represents any type of speech output. The present invention focuses on innovations related to the dialog management module 128 and may also relate to other components of the dialog system.

ASR module 124 may analyze speech input and may provide a transcription of the speech input as output. SLU module 126 may receive the transcribed input and may use a natural language understanding model to analyze the group of words that are included in the transcribed input to derive a meaning from the input. The role of DM module 128 is to interact in a natural way and help the user to achieve the task that the system is designed to support. DM module 128 may receive the meaning of the speech input from SLU module 126 and may determine an action, such as, for example, providing a response, based on the input. SLG module 130 may generate a transcription of one or more words in response to the action provided by DM 128. TTS module 132 may receive the transcription as input and may provide generated audible speech as output based on the transcribed speech.

Thus, the modules of system 120 may recognize speech input, such as speech utterances, may transcribe the speech input, may identify (or understand) the meaning of the transcribed speech, may determine an appropriate response to the speech input, may generate text of the appropriate response and from that text, may generate audible "speech" from system 120, which the user then hears. In this manner, the user can carry on a natural language dialog with system 120. Those of ordinary skill in the art will understand the programming languages and means for generating and training ASR module 124 or any of the other modules in the spoken dialog system. Further, the modules of system 120 may operate independent of a full dialog system. For example, a computing device such as a smartphone (or any processing device having a phone capability) may have an ASR module 124 wherein a user may say "call mom" and the smartphone may act on the instruction without a "spoken dialog."

FIG. 2 illustrates a method embodiment for receiving a notification of communication with a user. The method may be practiced by a type of system or device depending on the particular application. First, the method includes receiving a notification of communication from a user (202). In one aspect, the notification of communication is an incoming phone call, email, video conference, or SMS message.

Second, the method includes converting information related to the notification to speech (204). In one aspect, information related to the notification is one or more of a telephone number, an area code, a geographic origin of the request, caller ID, a voice message, address book information, a text message, an email, a subject line, an importance level, a photograph, a video clip, metadata, an IP address, or a domain name. For example, if your spouse calls your phone, information about your spouse is converted to speech, such as "Your wife, Jane Doe, is calling from home" or "Your wife, Jane Doe, is calling from her cell phone." Another example includes if you receive an email from a co-worker, information about the co-worker is converted to speech, such as "Sam Smith just wrote you an urgent email about the quarterly report." Information related to the notification is drawn from multiple sources and combined to a speech notification. Information from caller ID or an address book is used to glean a name, information from the email itself is used to discover the topic of the message or an urgency level, and information from metadata is used to tag a notification into a class or category. A dialog management module similar to those used in spoken dialog systems may be converted to receive various pieces of information to generate a natural language response. A text-to-speech module or other speech synthesis module may be employed to generate the speech.

Third, the method includes outputting the information as speech to the user (206). One aspect of the method outputs the information to the user via a hands-free device. Such a hands-free device can be a Bluetooth hands-free headset, such as a Jawbone® or Jabra FreeSpeak®. Other hands-free devices will also suffice, so long as the device is capable of outputting speech. Hands-free devices can be loose collections of devices which perform the same basic function of outputting information as speech. One such example is using the pre-existing speakers in a car to output information that would otherwise be output to a cell phone. Another such example is an earphone and microphone connected with a cable to a cellular phone. Hands-free devices are not required to be wireless. In the future, cell phones could conceivably become small enough to become incorporated with a hands-free headset directly into one package.

In another aspect of outputting the information as speech, the information is only outputted to the user if the notification is assigned an importance level of the notification is above a dynamic or static threshold. One example of where this may be useful is if a user is in a critical meeting with a client. During a meeting like this, a user only wants important phone calls to come through and everything else can go to voice mail. The user sets the highest importance level and only those calls marked as very important are allowed to reach the user. Calls can be marked with relative importance based on who is calling, the caller entering a digit representing an importance level, speaking with an operator, etc. An example of a static threshold is calls with importance of 9 or higher. An example of a dynamic threshold is calls as important as or more important than what the user is currently doing.

The audio notification may be integrated with other devices, such as a Garmin GPS system or a radio. Thus, the actual generation of an audio notification may occur via a different device.

If the user ignores a high importance notification, one aspect of the method outputs the information to the user again. One example of how this may be accomplished is to output the following as speech to the user: "Your co-worker, Sam Smith, has an urgent message regarding the quarterly report. Are you sure you want to ignore?" The second notification can simply repeat the first vocal notification, include an additional phrase, or output a vocal notification completely different from the first. An example of a repeat of the first vocal notification is "Sam Smith is calling from the office." That example does not indicate that the call is urgent or that the notification is a second attempt. The "are you sure you want to ignore?" example above demonstrates including an additional phrase. An example of a completely different vocal notification is "Sam Smith's call is very urgent and has been ignored one time. Are you sure you want to continue to ignore his phone call?"

In another aspect, outputting the information again includes an indication of the importance level or an explanation of why the importance level is high. An example of this is a notification like "Sam Smith's call is a level 1 priority call." Another example is a notification like "Sam Smith's call is very important because it concerns today's critical deadline." These two aspects of indicating an importance level and a reason why the notification is important may be combined into a single vocal notification.

One aspect of the invention relates to multiple user profiles used for different scenarios or environments. Some examples of multiple scenarios that are suited for multiple user profiles are the office, home, driving, in a movie theater, at dinner, etc. A user profile for the office may allow all work-related notifications. A home profile may disallow all work-related notifications. A driving profile may allow only notifications that are marked important or urgent. A movie theater profile may disallow all notifications except the most urgent. A dinner profile may allow all notifications from local phone calls. In one embodiment a blend of classes of importance, classes of caller, and specific callers can be allowed or disallowed.

Fourth, the method includes receiving from the user an instruction to accept or ignore the incoming communication associated with the notification 208. In one embodiment, the instruction is a vocal instruction to accept or ignore the communication associated with the notification can be a predetermined word or phrase, such as "yes" or "no", or "take call" or "ignore call". Predetermined words or phrases can be either set by the user or a pre-programmed phrase that the hardware recommends. For example, a user could record the word "hello" and mark it as a word used to accept phone calls and record the word "goodbye" and mark it as a word used to ignore phone calls.

Vocal instructions also include silence. For example, a user may indicate that any word may be used to answer a call, but silence indicates an instruction to ignore the notification. In one embodiment, speech recognition and artificial intelligence are used to process what the user says in order to understand what the user wants to do with the notification. For example, if a user says "Yes, OK. I think I want to take that call from Sam", a simple speech recognition and artificial intelligence can recognize that the user wants to answer the call. The instruction may not be usual but a button press or other multimodal input.

Figure 3A:
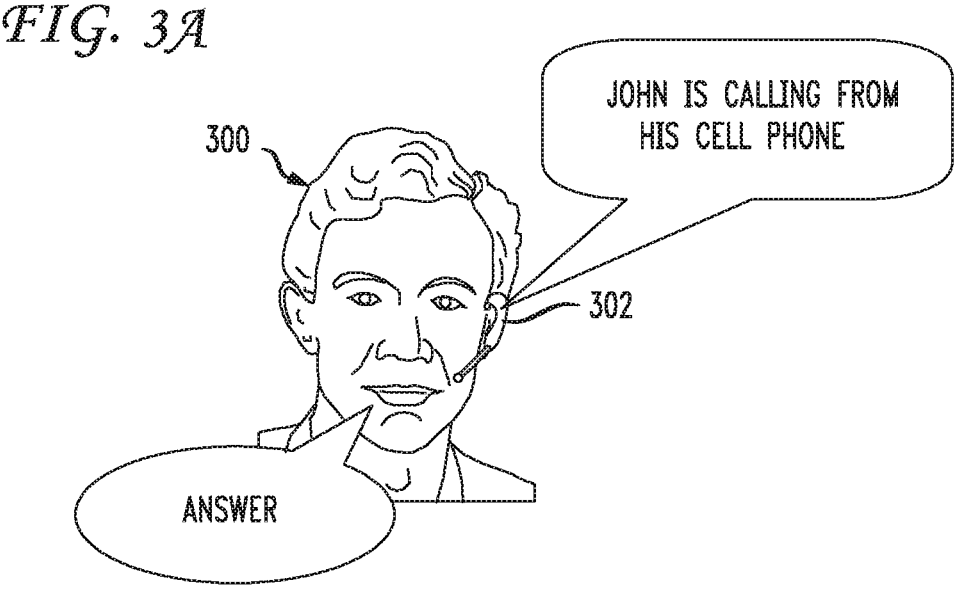
FIG. 3A illustrates a dialog between an exemplary system and a user.

FIG. 3A illustrates a dialog between an exemplary system and a user. The system communicates to the user 300 via a hands-free headset 302 in the user's ear. The system described herein is typical of a Bluetooth hands-free headset paired with a cellular phone. As a phone call is received, the system notifies the user through the headset by saying "John is calling from his cell phone" 310. The user orally instructs the system how to respond to the notification of the incoming call. In this example, the user instructs the system "Answer" 312. The system proceeds to answer the incoming call and patches it through to the user.

Figure 3B:
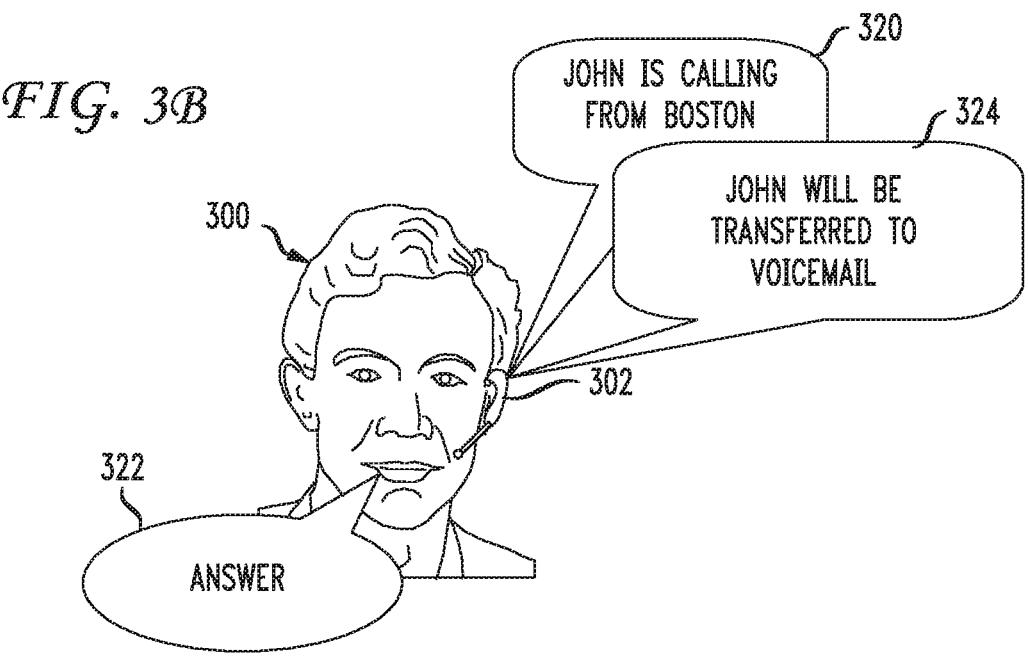
FIG. 3B illustrates a dialog between an exemplary system and a user.

FIG. 3B illustrates a dialog between an exemplary system and a user. The system communicates to the user 300 via a hands-free headset 302 in the user's ear. As a phone call is received, the system notifies the user through the headset by saying "John is calling from Boston" 320. The user orally instructs the system "Ignore" 322. The system responds through the headset, informing the user what will be done with the ignored incoming call: "John will be transferred to voicemail" 324.

FIG. 3C illustrates a dialog between an exemplary system and a user. The system communicates to the user 300 via a hands-free headset 302 in the user's ear. As a phone call is received, the system notifies the user through the headset by saying "John is calling" 330. The user orally instructs the system "Ignore" 332. The system responds through the headset, informing the user that the call from John is of high importance and why it is of high importance by saying "This call is marked urgent because it relates to your tax return. Will you take it now?" 334. The user makes a decision to answer or not answer the call based on the further, system-provided information. The user expresses that decision orally to the system by saying "Ignore" 336 again. At this point the system ignores the phone call and either lets the call go to voice mail, returns a busy signal, or simply lets the call ring until the caller gives up.

FIG. 3D illustrates a dialog between an exemplary system and a user. The system communicates to the user 300 via a hands-free headset 302 in the user's ear. As a Short Message Service (SMS) text message is received, the system notifies the user through the headset by converting the SMS text message to speech and introducing the SMS text message to the user, saying "John messaged 'where are you?'" 340. The user orally instructs the system "Reply 'on the expressway'" 342. The system then utilizes speech recognition to convert the oral command to text, parses the converted text, and sends a reply SMS text message "on the expressway" to John. As this is done, the system gives feedback to the user "Messaging 'on the expressway' to John" 344. This feedback serves at least two purposes. First, a user knows who the message is going to. Second, a user can hear what the system understood was the message and can stop the system if the speech recognition was incorrect.

These principles are applicable to receiving emails; however listening and replying to a lengthy email may become difficult. A system conveying incoming emails through a headset can orally notify a user of the contents of short emails and can simply orally notify a user of receipt of an incoming email if the email is too long to feasibly read aloud to the user.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. When a "tangible" computer-readable medium is recited, it expressly excludes software per se and a signal in an air interface or a wireless signal per se. Thus, any such connection is properly termed a computer-readable medium.

Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the processes described herein may have application in telephone calls, video conferencing, text messaging, or electronic entrance systems using 2-way communication, etc. Furthermore, the response to the notification of a communication may not be audible. The use may have a button on a steering wheel or on a portable device or a foot button that may be used to accept or reject the communication. Those skilled in the art will readily recognize various modifications and changes that may be made to the present invention without following the example embodiments and applications illustrated and described herein, and without departing from the true spirit and scope of the present invention.

I claim:

1. A system comprising:
   a processor; and
   a memory that stores executable instructions that, when executed by the processor, facilitate performance of operations, comprising:
   modifying a threshold to generate a modified threshold;
   determining an importance level of an incoming communication associated with an entity; and
   responsive to the importance level indicating that the incoming communication associated with the entity satisfies a requisite importance according to the modified threshold, presenting synthesized speech based on a notification that is associated with the incoming communication.

2. The system of claim 1, wherein the modifying of the threshold is based on a current user activity.

3. The system of claim 1, wherein the modifying of the threshold is according to a caller identity.

4. The system of claim 1, wherein the notification presents a first option to accept the incoming communication and a second option to ignore the incoming communication.

5. The system of claim 1, wherein the presenting of the synthesized speech occurs by transmitting the synthesized speech to an integrated device.

6. The system of claim 5, wherein the integrated device is a hands-free device.

7. A method comprising:
   determining, via a system including processor, an importance level of an incoming communication associated with an entity; and
   responsive to the importance level indicating that the incoming communication associated with the entity satisfies a requisite importance according to a threshold, presenting synthesized speech based on a notification that is associated with the incoming communication.

8. The method of claim 7, wherein the determining of the importance level comprises accessing an address book.

9. The method of claim 7, further comprising modifying the threshold according to a caller identity.

10. The method of claim 7, further comprising modifying the threshold based on a current user activity.

11. The method of claim 7, wherein the notification presents an option for processing the incoming communication.

12. The method of claim 11, wherein the option includes accepting the incoming communication and ignoring the incoming communication.

13. The method of claim 7, wherein the presenting of the synthesized speech occurs by transmitting the synthesized speech to an integrated device.

14. The method of claim 13, wherein the integrated device is a hands-free device.

15. The method of claim 7, wherein the importance level is determined based on one of a telephone number, an area code, a geographic origin of the incoming communication, a caller identification, a voice message, a text message, an email, a subject line, a photograph, a video clip, metadata, an Internet Protocol address, a domain name, or a combination thereof.

16. The method of claim 7, wherein the requisite importance is satisfied responsive to the importance level being above the threshold.

17. The method of claim 7, wherein the requisite importance is satisfied responsive to the importance level being below the threshold.

18. A computer-readable storage device having instructions stored which, when executed by a computing device, result in operations comprising:
   accessing information stored in conjunction with an address book;
   determining an importance level of an incoming communication associated with an entity according to the information; and
   responsive to the importance level indicating that the incoming communication associated with the entity satisfies a requisite importance according to a threshold, presenting synthesized speech based on a notification that is associated with the incoming communication.

19. The computer-readable storage device of claim 18, wherein the operations further comprise modifying the threshold based on a current user activity.

20. The computer-readable storage device of claim 18, wherein the notification presents a first option to accept the incoming communication and a second option to ignore the incoming communication.

* * * * *